US012421860B2

(12) United States Patent
Kovanis et al.

(10) Patent No.: US 12,421,860 B2
(45) Date of Patent: Sep. 23, 2025

(54) ANNULUS FILLER FOR A GAS TURBINE ENGINE

(71) Applicant: ROLLS-ROYCE plc, London (GB)

(72) Inventors: Anastasios Kovanis, Derby (GB); Andrew Mekeresz, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 18/636,837

(22) Filed: Apr. 16, 2024

(65) Prior Publication Data

US 2024/0360770 A1 Oct. 31, 2024

(30) Foreign Application Priority Data

Apr. 27, 2023 (GR) .............................. 20230100354

(51) Int. Cl.

*F01D 11/00* (2006.01)
*F01D 5/14* (2006.01)
*F01D 5/30* (2006.01)

(52) U.S. Cl.

CPC .............. *F01D 11/008* (2013.01); *F01D 5/14* (2013.01); *F01D 5/30* (2013.01); *F05D 2220/36* (2013.01)

(58) Field of Classification Search

CPC ........ F01D 11/008; F01D 5/3007; F01D 5/02; F01D 5/30; F01D 5/282; F01D 5/143; F01D 5/14; F01D 5/145; F01D 5/147; F01D 25/06; F01D 25/28; F01D 5/22; F01D 5/26; F01D 5/3015; F01D 11/006; F01D 5/066; F05D 2300/603; F05D 2220/32; F05D 2220/36; F05D 2240/80; F05D 2260/30; F05D 2260/36; F05D 2250/71; F05D 2250/712; F04D 29/322

See application file for complete search history.

(56) References Cited

U.S. PATENT DOCUMENTS

| | | | | |
|---|---|---|---|---|
| 5,466,125 | A * | 11/1995 | Knott | F01D 5/3007 416/193 A |
| 8,297,931 | B2 | 10/2012 | Read et al. | |
| 8,814,521 | B2 * | 8/2014 | Hoyland | F01D 11/008 416/193 R |
| 9,228,444 | B2 | 1/2016 | Evans et al. | |

(Continued)

FOREIGN PATENT DOCUMENTS

EP 2 837 773 B1 11/2016

OTHER PUBLICATIONS

Nov. 27, 2023 Search Report issued in British Patent Application No. 2308610.1.

*Primary Examiner* — Eric J Zamora Alvarez
(74) *Attorney, Agent, or Firm* — Oliff PLC

(57) ABSTRACT

An annulus filler for mounting to a rotor disc of a gas turbine engine includes a coupling portion and an outer lid coupled to the coupling portion. The outer lid includes a leading edge, a trailing edge, and a main portion including an outer radial surface. The outer lid further includes a protruding portion connected to the main portion and extending radially outwardly from the main portion. The protruding portion is axially disposed between and spaced apart from the leading edge and the trailing edge. The protruding portion includes a protruding surface contiguous with and extending radially outwardly from the outer radial surface, such that the protruding surface is configured to redirect air drawn through the gas turbine engine.

14 Claims, 5 Drawing Sheets

(56) References Cited

U.S. PATENT DOCUMENTS

| | | | | |
|---|---|---|---|---|
| 9,752,449 | B2 | 9/2017 | Bottome et al. | |
| 9,926,798 | B2 | 3/2018 | Vest | |
| 10,227,884 | B2 * | 3/2019 | Alarcon | F01D 5/02 |
| 10,344,601 | B2 * | 7/2019 | Turner | F01D 11/008 |
| 10,590,798 | B2 * | 3/2020 | Luczak | F01D 5/3084 |
| 10,746,031 | B2 | 8/2020 | Heeter et al. | |
| 11,131,202 | B2 | 9/2021 | Thompson et al. | |
| 2015/0204201 | A1 | 7/2015 | Turner et al. | |

* cited by examiner

ANNULUS FILLER FOR A GAS TURBINE ENGINE

CROSS-REFERENCE TO RELATED APPLICATIONS

This specification is based upon and claims the benefit of priority from Greek patent application number GR 20230100354 filed on Apr. 27, 2023, the entire contents of which is incorporated herein by reference.

BACKGROUND

1. Field of the Disclosure

The present disclosure generally relates to an annulus filler for a gas turbine engine.

2. Brief Description of the Related Art

A rotor stage in a gas turbine engine generally includes a plurality of radially extending rotor blades mounted on a rotor disc. Passages between adjacent rotor blades near a radially inward portion of the rotor blades adjacent to the rotor disc may be filled by platforms integral to the respective rotor blades or by annulus fillers, which are separate from the rotor blades. In the latter case, annulus fillers define a radially inward airflow surface for air being drawn through the gas turbine engine as the air passes over the rotor disc.

Annulus fillers typically include engagement features for removably attaching the annulus filler to the rotor disc, and an annulus filler lid defining the radially inward airflow surface. Generally, a shape of the annulus filler lid is produced by revolving a desired profile around an engine axis. This results in a uniform radial surface for the annulus filler lid. The uniform radial surface may be unable to influence the air passing over the annulus filler in order to achieve desirable outcomes.

SUMMARY OF THE DISCLOSURE

According to a first aspect, there is provided an annulus filler for mounting to a rotor disc of a gas turbine engine. The annulus filler includes a coupling portion connectable to the rotor disc. The annulus filler further includes an outer lid coupled to the coupling portion and extending axially, radially, and circumferentially with respect to a central axis. The outer lid is configured to be at least partially and circumferentially disposed between two adjacent blades connected to the rotor disc. The outer lid includes a leading edge extending at least circumferentially with respect to the central axis. The outer lid further includes a trailing edge axially spaced apart from the leading edge and extending at least circumferentially with respect to the central axis. The outer lid further includes a main portion including an outer radial surface extending between the leading edge and the trailing edge opposite to the coupling portion. The outer radial surface is configured to engage air drawn through the gas turbine engine. The outer lid further includes a protruding portion connected to the main portion and extending radially outwardly from the main portion with respect to the central axis. The protruding portion is axially disposed between and spaced apart from the leading edge and the trailing edge. The protruding portion includes a protruding surface contiguous with and extending radially outwardly from the outer radial surface with respect to the central axis, such that the protruding surface is configured to redirect the air drawn through the gas turbine engine.

The outer lid of the annulus filler of the present disclosure includes the protruding portion extending radially outwardly from the main portion with respect to the central axis. The protruding portion may provide a circumferentially, radially, and axially variable surface to the outer lid, thereby influencing the air drawn through the gas turbine engine as the air passes over the outer lid of the annulus filler. Thus, the protruding surface of the protruding portion may redirect the air drawn through the gas turbine engine.

In some cases, the protruding portion may be in the form of a localised hump that influences the air flowing through a passage between the adjacent blades (i.e., a passage flow). The localised protruding portion of the outer lid may generate variation in a static pressure field of the passage flow, which may influence a topology of a secondary flow (generated by cross-passage pressure gradients) at a blade hub of the blades. Specifically, the aforementioned aerodynamic behaviour may influence an axial location where a vortical structure of the secondary flow is formulated, a radial position of the vortical structure, and an intensity of the vortical structure. The shape of the outer lid including the protruding portion may result in a change of the cross-passage pressure gradient and an aerodynamic loading of the blades.

The secondary flow may travel downstream to subsequent rotor stages. The present invention may not only increase an efficiency of a blade root component of the blades at the blade hub but also enables reduction in induced forced vibrations of the subsequent rotor stages. The aforementioned desirable effects work at all operating conditions of the gas turbine engine and are most effective during cruise conditions, which is a major part of engine operational cycle.

In some embodiments, the outer lid further includes a first longitudinal edge extending at least axially between the leading edge and the trailing edge. The outer lid further includes a second longitudinal edge spaced apart from the first longitudinal edge and extending at least axially between the leading edge and the trailing edge, such that the outer radial surface is disposed between the first longitudinal edge, the second longitudinal edge, the leading edge, and the trailing edge. The first longitudinal edge may be disposed adjacent to one adjacent blade and the second longitudinal edge may be disposed adjacent to the other adjacent blade. Thus, the outer radial surface of the main portion of the outer lid may engage the air flowing between the adjacent blades.

In some embodiments, the protruding portion at least partially forms the second longitudinal edge of the outer lid. The protruding portion may form a portion of the second longitudinal edge of the outer lid. The second longitudinal edge of the outer lid may be disposed adjacent to a suction side of the adjacent blade. Thus, the protruding portion may influence the air flowing adjacent to the suction side of the respective blade.

In some embodiments, the outer lid extends at least circumferentially with respect to the central axis by a maximum circumferential width. The protruding portion extends at least circumferentially with respect to the central axis by a maximum circumferential extent. The maximum circumferential extent of the protruding portion is less than or equal to 80% of the maximum circumferential width of the outer lid. The protruding portion may extend at least circumferentially to enable manipulation of the passage flow.

In some embodiments, the outer lid extends at least axially with respect to the central axis by a maximum axial length. The protruding portion extends at least axially with respect to the central axis by a minimum axial extent. The minimum axial extent of the protruding portion is greater than or equal to 50% of the maximum axial length of the outer lid. The protruding portion may extend at least axially to enable manipulation of the passage flow.

In some embodiments, the outer radial surface defines a nominal plane extending between the leading edge and the trailing edge. The protruding surface extends radially outwardly from the nominal plane by a maximum radial extent at a peak of the protruding portion. The maximum radial extent of the protruding surface is less than or equal to 20% of the maximum axial length of the outer lid. The protruding portion may extend radially outwardly to enable manipulation of the passage flow. The peak may correspond to a radially outermost point of the protruding portion with respect to the nominal plane.

The aforementioned relationships between the various extents of the protruding portion (i.e., the maximum circumferential extent, the minimum axial extent, and the maximum radial extent) and the extents of the outer lid (i.e., the maximum circumferential width and the maximum axial length) may provide optimal manipulation of the passage flow.

In some embodiments, the outer radial surface is piecewise planar. This may enable smooth flow of the air between the adjacent blades.

According to a second aspect, there is provided a rotor assembly for a gas turbine engine. The rotor assembly includes a rotor disc and a plurality of blades coupled to the rotor disc and angularly spaced apart from each other. The rotor assembly further includes a plurality of annulus fillers according to the first aspect. Each of the plurality of annulus fillers bridges a gap between corresponding adjacent blades from the plurality of blades. The coupling portion of each annulus filler is coupled to the rotor disc.

In some embodiments, each blade includes a blade leading edge, a blade trailing edge spaced apart from the blade leading edge, a pressure surface extending between the blade leading edge and the blade trailing edge, and a suction surface extending between the blade leading edge and the blade trailing edge opposite to the pressure surface. Each blade defines a blade chord length between the blade leading edge and the blade trailing edge at a radial span disposed at the outer radial surface of the annulus filler adjacent to the suction surface. A minimum axial distance between the blade leading edge and the protruding portion is less than or equal to 25% of the blade chord length. This may allow manipulation of the passage flow to generate the aforementioned aerodynamic effects.

In some embodiments, a maximum axial distance between the blade leading edge and the protruding portion is greater than or equal to 75% of the blade chord length. This may allow manipulation of the passage flow to generate the aforementioned aerodynamic effects.

The aforementioned positions of the protruding portion with respect to the adjacent blades (i.e., the minimum axial distance and the maximum axial distance) may provide optimal manipulation of the passage flow.

In some embodiments, the protruding portion is circumferentially disposed closer to the suction surface of one adjacent blade than the pressure surface of the other adjacent blade. This may allow manipulation of the passage flow close to the suction surface of the one adjacent blade.

In some embodiments, the maximum circumferential extent of the protruding portion is less than or equal to 80% of the maximum circumferential distance between the suction surface of one adjacent blade and the pressure surface of the other adjacent blade. This may allow manipulation of the passage flow to generate the aforementioned aerodynamic effects.

In some embodiments, the minimum axial extent of the protruding portion is greater than or equal to 50% of the blade chord length. This may allow manipulation of the passage flow to generate the aforementioned aerodynamic effects.

In some embodiments, the maximum radial extent of the protruding surface is less than or equal to 20% of the blade chord length. This may allow manipulation of the passage flow to generate the aforementioned aerodynamic effects.

The aforementioned relationships between the various extents of the protruding portion (i.e., the maximum circumferential extent, the minimum axial extent, and the maximum radial extent) and the blade chord length may provide optimal manipulation of the passage flow.

According to a third aspect, there is provided a gas turbine engine including at least one annulus filler of the first aspect or the rotor assembly of the second aspect.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
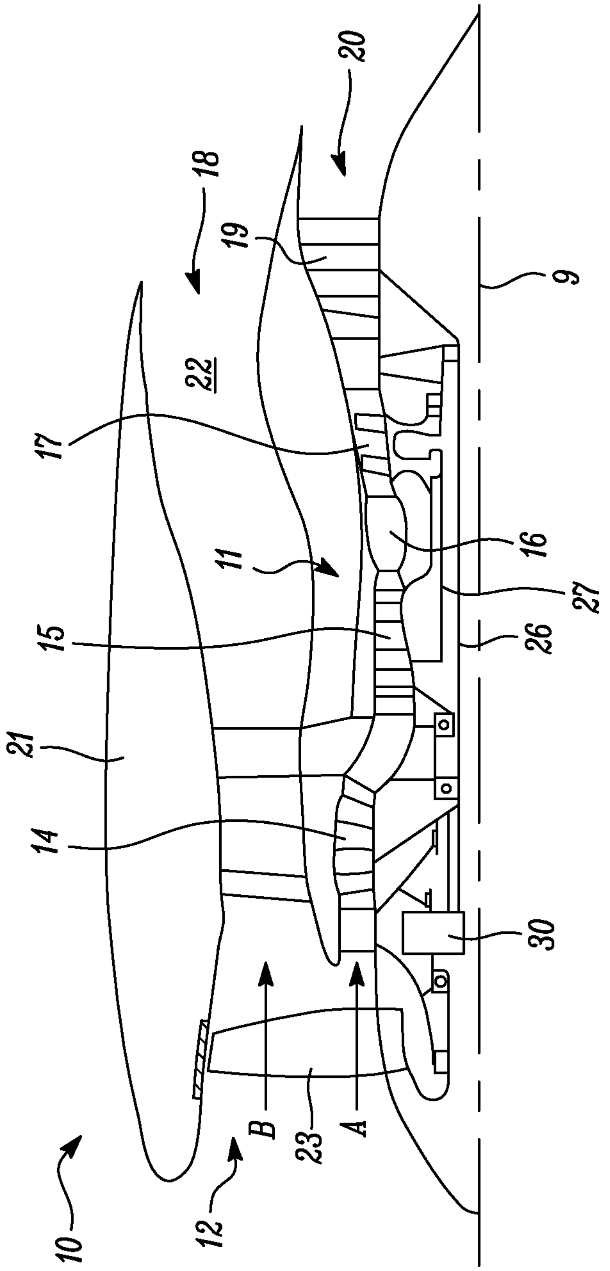
FIG. 1 is a sectional side view of a gas turbine engine.

FIG. 1 illustrates a gas turbine engine 10 having a principal rotational axis 9, according to an embodiment of the present disclosure. The gas turbine engine 10 comprises an air intake 12 and a propulsive fan 23 that generates two airflows: a core airflow A and a bypass airflow B. The gas turbine engine 10 further comprises an engine core 11 that receives the core airflow A. The engine core 11 comprises, in axial flow series, a low pressure compressor 14, a high pressure compressor 15, a combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting core shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23), respectively, and/or the turbine and compressor stages that are connected together by the interconnecting core shaft 27 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the engine core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle), or a turboprop engine, for example. In some arrangements, the gas turbine engine 10 may not comprise the gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
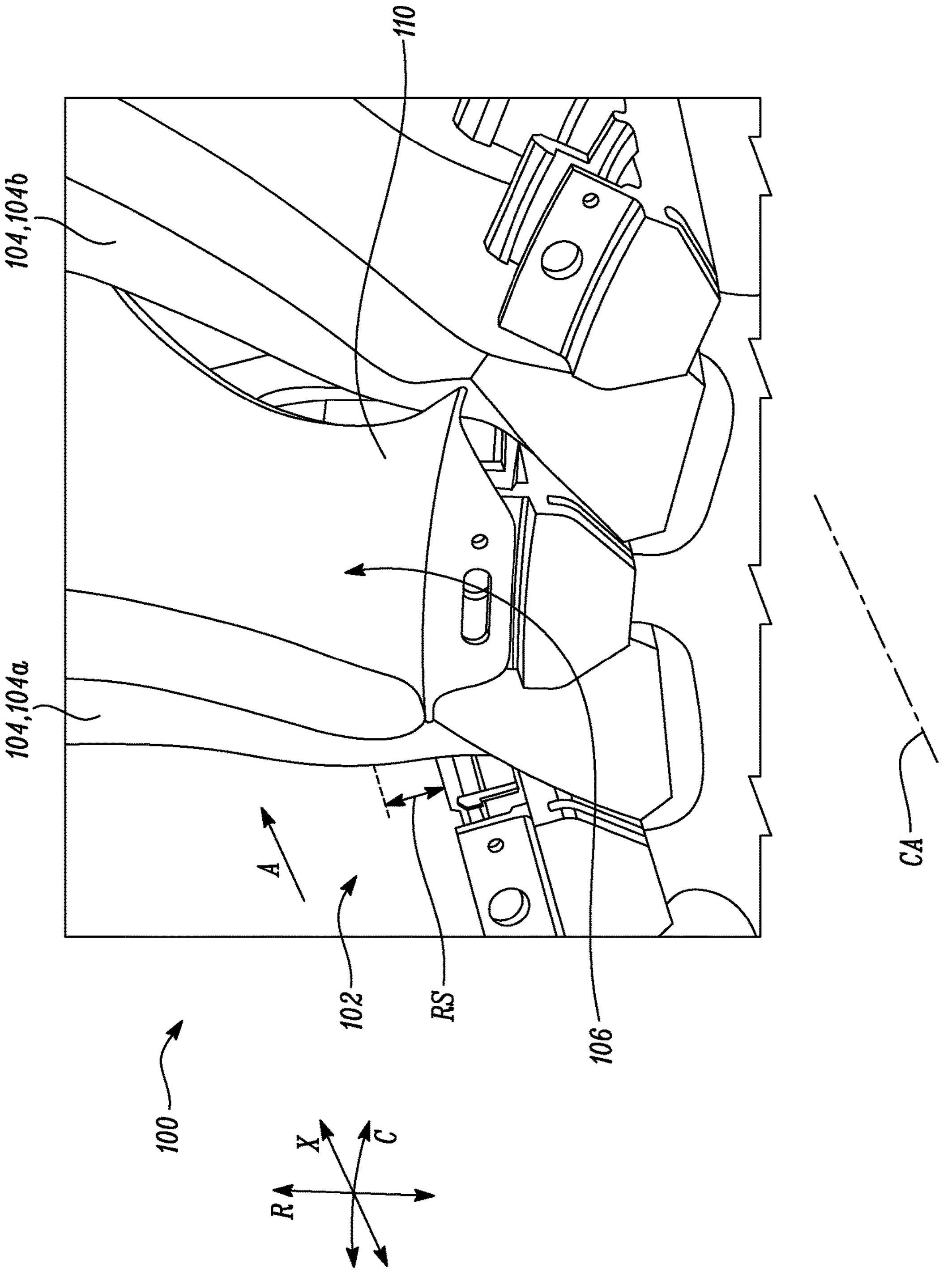
FIG. 2 is a partial schematic front perspective view of a rotor assembly of the gas turbine engine showing part of an annulus filler of the present disclosure.

FIG. 2 is a partial schematic front perspective view of a rotor assembly 100 of the gas turbine engine 10 (shown in FIG. 1). In some embodiments, the rotor assembly 100 may be a part of the low pressure compressor 14 (shown in FIG. 1). However, the rotor assembly 100 may also be a part of other compressors of the gas turbine engine 10, e.g., the high pressure compressor 15 or the fan 23 shown in FIG. 1. The rotor assembly 100 includes a rotor disc 102. Specifically, FIG. 2 shows a portion of a radially outer surface of the rotor disc 102 of the rotor assembly 100.

An axial direction X is defined that is aligned with a central axis CA (or the principal rotational axis 9) of the gas turbine engine 10 (shown in FIG. 1). As used herein, terms that refer to an axial direction, such as "axially disposed", "axially extends", "axially spaced apart", "axially proximal", "axially between", "extend axially", and "extending axially" are with respect to the axial direction X. A radial direction R is defined with respect to the central axis CA perpendicular to the axial direction X. As used herein, terms that refer to a radial direction, such as "radially outer", "radially outside", "radially inner", "radially extends", "radially inwards", "radially outwards", "radially outwardly", "radially spaced apart", "radially proximal", "extend radially", and "extending radially" are with respect to the radial direction R. A circumferential direction C is defined with respect to the central axis CA. As used herein, terms that refer to a circumferential direction, such as "circumferentially extends", "circumferentially extending", "circumferentially surrounding", "circumferentially inclined", "circumferentially with respect to", "circumferentially disposed", "extend circumferentially", and "extending circumferentially" are with respect to the circumferential direction C.

The rotor assembly 100 further includes a plurality of blades 104 coupled to the rotor disc 102 and angularly spaced apart from each other. The blades 104*a*, 104*b* are shown in FIG. 2 for the purpose of illustration. In some embodiments, the plurality of blades 104 are angularly spaced apart from each other along the circumferential direction C. In some embodiments, the rotor disc 102 may include retention grooves (not shown) for retaining a root portion (not shown) of the corresponding blade 104 from the plurality of blades 104. The retention grooves may be straight and extend in the axial direction X.

In some embodiments, the rotor assembly 100 further includes a plurality of annulus fillers 110. Only one annulus filler 110 from the plurality of annulus fillers 110 is visible in FIG. 2. Each of the plurality of annulus fillers 110 bridges a gap 106 between corresponding adjacent blades 104 from the plurality of blades 104. Specifically, each of the plurality of annulus fillers 110 bridges the gap 106 disposed at the radially outer surface of the rotor disc 102 between the corresponding adjacent blades 104. The term "plurality of annulus fillers 110" is interchangeably referred to hereinafter as the "annulus fillers 110".

In some embodiments, the plurality of annulus fillers 110 may ensure a smooth surface for an air A drawn through the gas turbine engine 10 (shown in FIG. 1) to flow over as the air A passes through the rotor assembly 100. In some embodiments, the annulus filler 110 is made of carbon fibre reinforced composite material. Other possible materials may include, but are not limited to, moulded polymer, fibre-reinforced polymer (e.g., glass, carbon, aramid, or polyurethane fibres in a thermosetting or thermoplastic polymer matrix), machined metal, extruded metal, cast metal, etc. Typical metals are aluminium, titanium, or magnesium alloys. However, other polymer-based composite and metallic material may also be used based on application requirements. In some embodiments, the annulus filler 110 may be integrally formed as a one-piece component.

Figure 3:
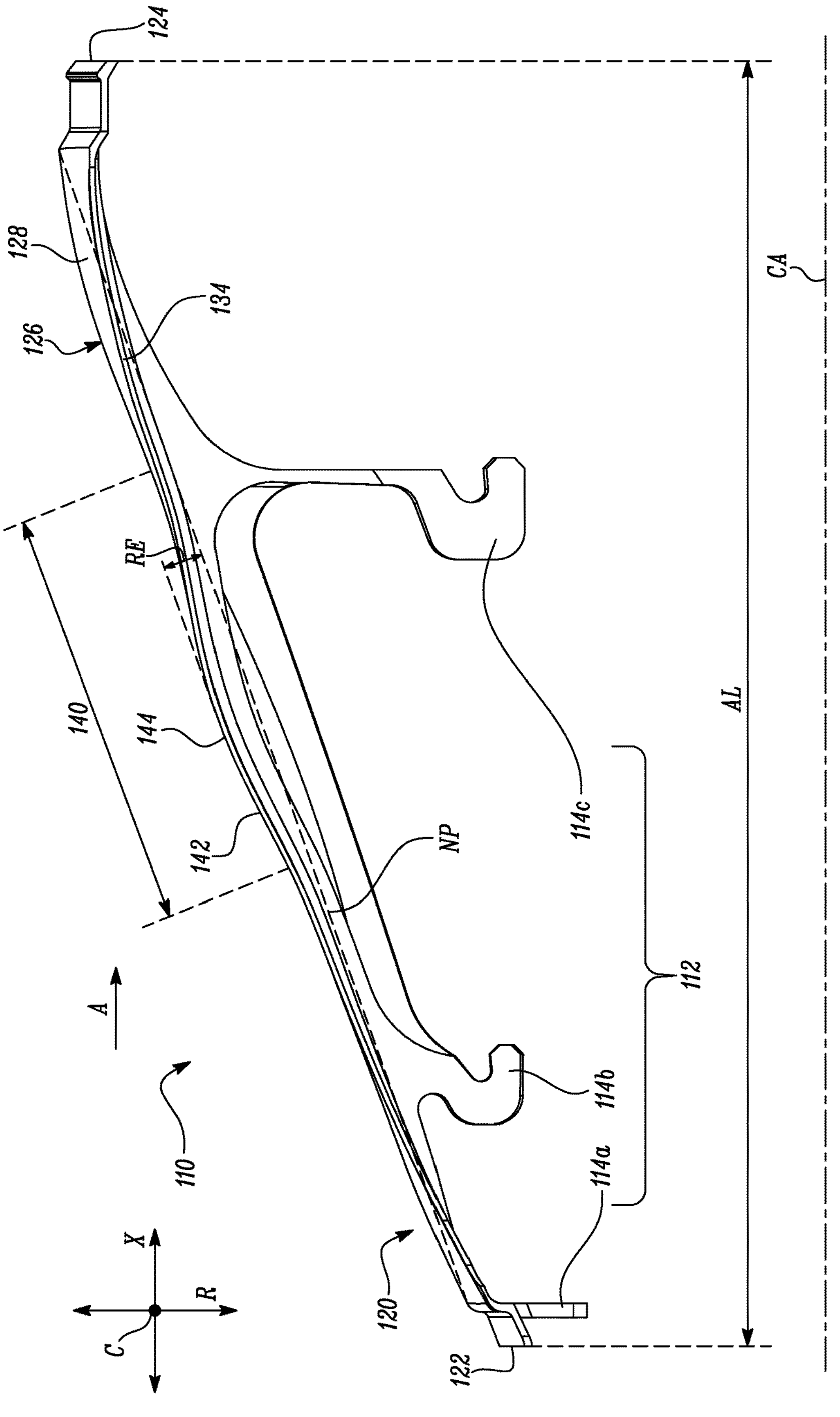
FIG. 3 is a schematic side view of an annulus filler according to an embodiment of the present disclosure.

FIG. 3 is a schematic side view of the annulus filler 110. Referring to FIGS. 2 and 3, the annulus filler 110 includes a coupling portion 112 (shown in FIG. 3) connectable to the rotor disc 102. Specifically, the coupling portion 112 of each annulus filler 110 is coupled to the rotor disc 102. In some embodiments, the coupling portion 112 includes axially spaced apart support structures 114*a*, 114*b*, 114*c* (e.g., hooks, engaging structures, etc.) which are connectable to complementary securing members (not shown) on the rotor disc 102. In some embodiments, the support structures 114*a*, 114*b*, 114*c* may allow the annulus filler 110 to be installed on the rotor disc 102 in a tool-less manner without requiring for any additional parts. In some embodiments, the support structures 114*a*, 114*b*, 114*c* may transfer centrifugal and/or radial loads to the securing members on the rotor disc 102 when the rotor disc 102 spins. In alternative configurations, the annulus filler 110 may have only one such support structure or may have more than two such support structures.

The annulus filler 110 further includes an outer lid 120 coupled to the coupling portion 112 and extending axially, radially, and circumferentially with respect to the central axis CA. The outer lid 120 and the rotor disc 102 may have a common central axis, i.e., the central axis CA. In some embodiments, the outer lid 120 extends axially along the axial direction X, radially along the radial direction R, and circumferentially along the circumferential direction C. The outer lid 120 is configured to be at least partially and circumferentially disposed between two adjacent blades 104 connected to the rotor disc 102. Each support structure 114*a*, 114*b*, 114*c* extends radially inwardly from the outer lid 120.

The outer lid 120 includes a leading edge 122 extending at least circumferentially with respect to the central axis CA. The leading edge 122 may be an upstream circumferential edge of the outer lid 120 with respect to a direction of flow of the air A. The outer lid 120 further includes a trailing edge 124 axially spaced apart from the leading edge 122 and extending at least circumferentially with respect to the central axis CA. The trailing edge 124 may be a downstream circumferential edge of the outer lid 120 with respect to the direction of flow of the air A. The outer lid 120 further includes a main portion 126 including an outer radial surface 128 extending between the leading edge 122 and the trailing edge 124 opposite to the coupling portion 112. The outer radial surface 128 is configured to engage the air A drawn through the gas turbine engine 10 (shown in FIG. 1). In other words, the outer radial surface 128 engages the air A as the air A is drawn through the rotor assembly 100. In some embodiments, a portion of the air A drawn through the gas turbine engine 10 may move along the outer radial surface 128. In some embodiments, the outer radial surface 128 is piecewise planar. This may enable smooth flow of the air A over the annulus filler 110.

Figure 4:
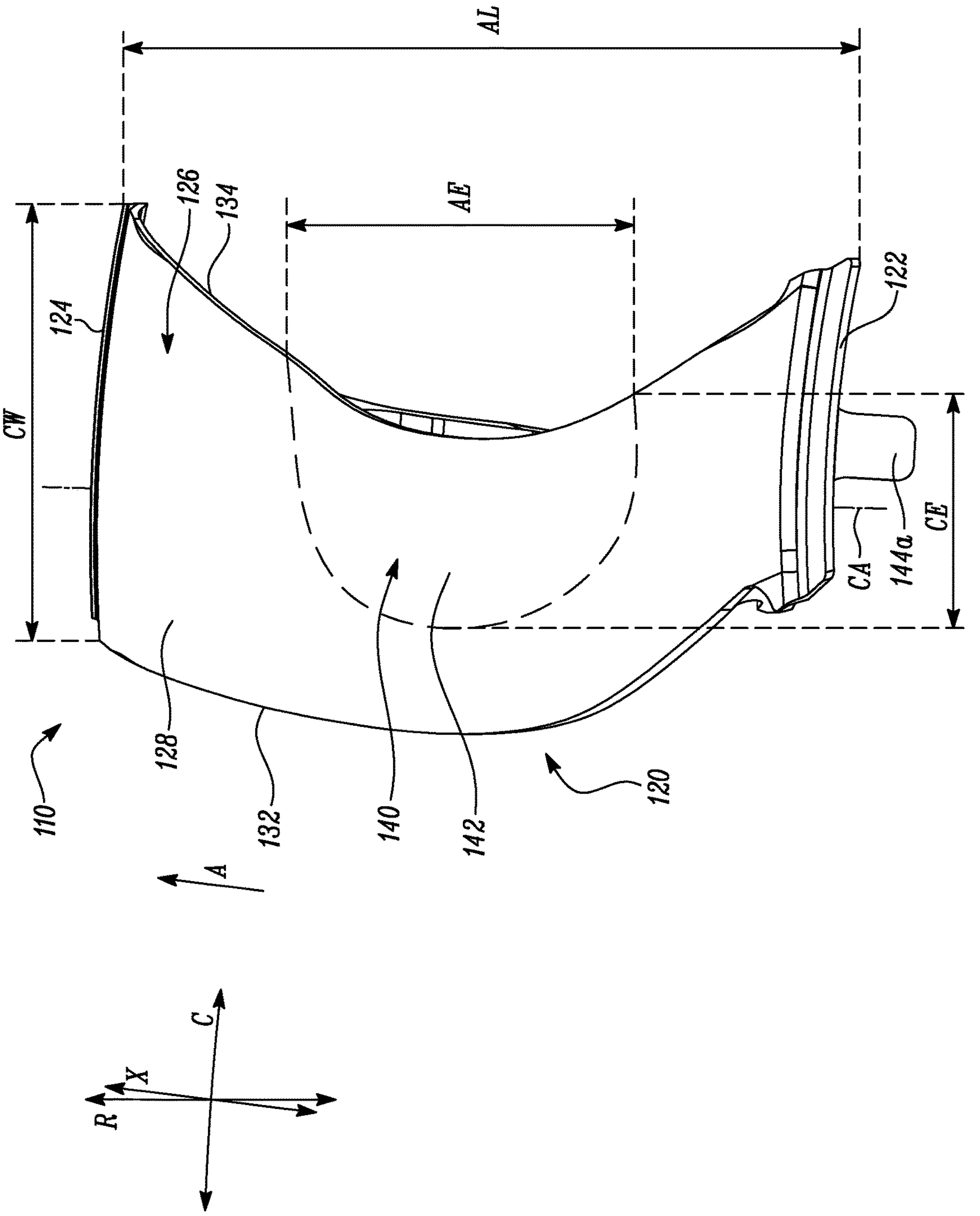
FIG. 4 is a schematic top perspective view of the annulus filler.

FIG. 4 is a schematic top perspective view of the annulus filler 110. Referring to FIGS. 3 and 4, in some embodiments, the outer lid 120 further includes a first longitudinal edge 132 extending at least axially between the leading edge 122 and the trailing edge 124. In some embodiments, the outer lid 120 further includes a second longitudinal edge 134 spaced apart from the first longitudinal edge 132 and extending at least axially between the leading edge 122 and the trailing edge 124, such that the outer radial surface 128 is disposed between the first longitudinal edge 132, the second longitudinal edge 134, the leading edge 122, and the trailing edge 124. Thus, the outer radial surface 128 of the main portion 126 may engage the air A drawn through the gas turbine engine 10.

The outer lid 120 further includes a protruding portion 140 (as indicated by a dashed line) connected to the main portion 126 and extending radially outwardly from the main portion 126 with respect to the central axis CA. The protruding portion 140 is axially disposed between and spaced apart from the leading edge 122 and the trailing edge 124. The protruding portion 140 includes a protruding surface 142 contiguous with and extending radially outwardly from the outer radial surface 128 with respect to the central axis CA, such that the protruding surface 142 is configured to redirect the air A drawn through the gas turbine engine 10 (shown in FIG. 1). The protruding portion 140 may provide a circumferentially, radially, and axially variable surface to the outer lid 120, thereby influencing the air A drawn through the gas turbine engine 10. Thus, the protruding surface 142 of the protruding portion 140 may redirect the air A as the air A passes over the outer lid 120 of the annulus filler 110.

In some embodiments, the protruding portion 140 at least partially forms the second longitudinal edge 134 of the outer lid 120. In other words, the protruding portion 140 extends from the second longitudinal edge 134 of the outer lid 120. In some embodiments, the protruding portion 140 may be in the form of a localised hump (or a bulge) extending radially outwardly from the outer radial surface 128. Thus, the air A being drawn through the gas turbine engine 10 (shown in FIG. 1) may be redirected along the protruding surface 142 as the air A moves over the outer lid 120.

In some embodiments, the protruding portion 140 may influence the air A flowing through the gap 106 (shown in FIG. 2). The air A flowing through the gap 106 may be referred to as a passage flow. The protruding portion 140 of the outer lid 120 may generate variation in a static pressure field of the passage flow, which may influence a topology of a secondary flow (generated by cross-passage pressure gradients) at a blade hub of the blades 104 (shown in FIG. 2). Specifically, the aforementioned aerodynamic behaviour may influence an axial location where a vortical structure of the secondary flow is formulated, a radial position of the vortical structure, and an intensity of the vortical structure. In some embodiments, the shape of the outer lid 120 including the protruding portion 140 may result in a change of the cross-passage pressure gradient and an aerodynamic loading of the blades 104.

The secondary flow may travel downstream to subsequent rotor stages. The present invention may not only increase an efficiency of a blade root component of the blades 104 at the blade hub but also enables reduction in induced forced vibrations of the subsequent rotor stages. The aforementioned desirable effects work at all operating conditions of the gas turbine engine 10 (shown in FIG. 1) and are most effective during cruise conditions, which is a major part of engine operational cycle.

Referring to FIG. 3, in some embodiments, the outer lid 120 extends at least axially with respect to the central axis CA by a maximum axial length AL. In some embodiments, the outer radial surface 128 defines a nominal plane NP extending between the leading edge 122 and the trailing edge 124. In some embodiments, the protruding surface 142 extends radially outwardly from the nominal plane NP by a maximum radial extent RE at a peak 144 of the protruding portion 140. In some embodiments, the peak 144 may correspond to a radially outermost point of the protruding portion 140 or the hump with respect to the nominal plane NP of the outer radial surface 128.

In some embodiments, the maximum radial extent RE of the protruding surface 142 is less than or equal to 20% of the maximum axial length AL of the outer lid 120, i.e., $RE \leq 0.2$ AL. The protruding portion 140 may extend radially outwardly to enable manipulation of the passage flow.

Referring to FIG. 4, in some embodiments, the outer lid 120 extends at least circumferentially with respect to the central axis CA by a maximum circumferential width CW.

In some embodiments, the protruding portion 140 extends at least circumferentially with respect to the central axis CA by a maximum circumferential extent CE. In some embodiments, the maximum circumferential extent CE of the protruding portion 140 is less than or equal to 80% of the maximum circumferential width CW of the outer lid 120, i.e., $CE \leq 0.8$ CW.

In some embodiments, the protruding portion 140 extends at least axially with respect to the central axis CA by a minimum axial extent AE. In some embodiments, the minimum axial extent AE of the protruding portion 140 is greater than or equal to 50% of the maximum axial length AL of the outer lid 120, i.e., $AE \geq 0.5$ AL.

The aforementioned relationships between the various extents of the protruding portion 140 (i.e., the maximum circumferential extent CE, the minimum axial extent AE, and the maximum radial extent RE) and the extents of the outer lid 120 (i.e., the maximum circumferential width CW and the maximum axial length AL) may provide optimal manipulation of the passage flow.

Figure 5:
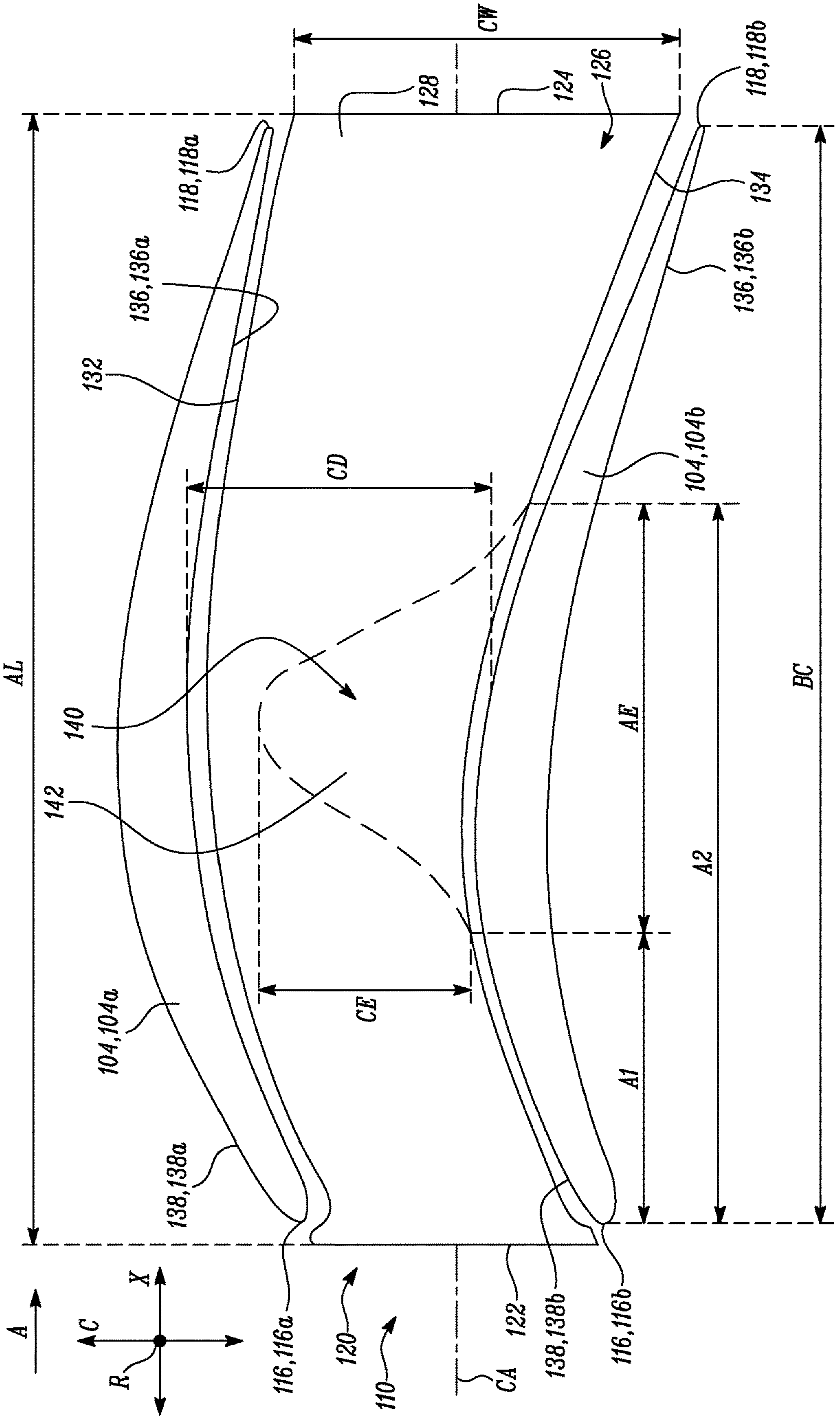
FIG. 5 is a schematic top view of the annulus filler disposed between adjacent blades of the rotor assembly.

FIG. 5 is a schematic top view of the annulus filler 110 disposed between corresponding adjacent blades 104 of the rotor assembly 100 (shown in FIG. 2). In the illustrated embodiment of FIG. 5, the blades 104*a*, 104*b* are shown for the purpose of illustration. In some embodiments, each blade 104 includes a blade leading edge 116, a blade trailing edge 118 spaced apart from the blade leading edge 116, a pressure surface 136 extending between the blade leading edge 116 and the blade trailing edge 118, and a suction surface 138 extending between the blade leading edge 116 and the blade trailing edge 118 opposite to the pressure surface 136.

In the illustrated embodiment of FIG. 5, the blade 104*a* includes the blade leading edge 116*a*, the blade trailing edge 118*a*, the pressure surface 136*a*, and the suction surface 138*a*. Similarly, the blade 104*b* includes the blade leading edge 116*b*, the blade trailing edge 118*b*, the pressure surface 136*b*, and the suction surface 138*b*.

In some embodiments, the protruding portion 140 is circumferentially disposed closer to the suction surface 138 of one adjacent blade 104 than the pressure surface 136 of the other adjacent blade 104. In the illustrated embodiment of FIG. 5, the protruding portion 140 is circumferentially disposed closer to the suction surface 138*b* the blade 104*b* than the pressure surface 136*a* of the blade 104*a*. In alternative embodiments, the protruding portion 140 may be circumferentially disposed closer to the pressure surface 136*a* the blade 104*a* than the suction surface 138*b* of the blade 104*b*.

In some embodiments, the maximum circumferential extent CE of the protruding portion 140 is less than or equal to 80% of a maximum circumferential distance CD between the suction surface 138 of one adjacent blade 104 and the pressure surface 136 of the other adjacent blade 104, i.e., CE≤0.8 CD. Specifically, the maximum circumferential extent CE of the protruding portion 140 is less than or equal to 80% of the maximum circumferential distance CD between the suction surface 138*b* of the blade 104*b* and the pressure surface 136*a* of the blade 104*a*.

Each blade 104 (i.e., the blades 104*a*, 104*b*) defines a blade chord length BC between the blade leading edge 116 and the blade trailing edge 118 at a radial span RS (shown in FIG. 2) disposed at the outer radial surface 128 of the annulus filler 110 adjacent to the suction surface 138. As shown in FIG. 5, the blade 104*b* defines the blade chord length BC between the blade leading edge 116*b* and the blade trailing edge 118*b*. A minimum axial distance A1 between the blade leading edge 116*b* (or the blade leading edge 116*a*) and the protruding portion 140 is less than or equal to 25% of the blade chord length BC, i.e., A1≤0.25 BC. Further, a maximum axial distance A2 between the blade leading edge 116*b* (or the blade leading edge 116*a*) and the protruding portion 140 is greater than or equal to 75% of the blade chord length BC, i.e., A2≥0.75 BC.

The aforementioned positions of the protruding portion 140 with respect to the adjacent blades 104 (i.e., the minimum axial distance A1 and maximum axial distance A2) may provide optimal manipulation of the passage flow.

In some embodiments, the minimum axial extent AE of the protruding portion 140 is greater than or equal to 50% of the blade chord length BC, i.e., AE≥0.5 BC. Further, the maximum radial extent RE (shown in FIG. 3) of the protruding surface 142 is less than or equal to 20% of the blade chord length BC, i.e., RE≤0.2 BC.

The aforementioned relationships between the various extents of the protruding portion 140 (i.e., the maximum circumferential extent CE, the minimum axial extent AE, and the maximum radial extent RE) and the blade chord length BC may provide optimal manipulation of the passage flow.

Referring now to FIGS. 1-5, the outer lid 120 of the annulus filler 110 of the present disclosure includes the protruding portion 140 extending radially outwardly from the main portion 126 with respect to the central axis CA. The protruding portion 140 may provide a circumferentially, radially, and axially variable surface to the outer lid 120, thereby influencing the air A drawn through the gas turbine engine 10 as the air A passes over the outer lid 120 of the annulus filler 110. Thus, the protruding surface 142 of the protruding portion 140 may redirect the air A drawn through the gas turbine engine 10. The protruding portion 140 of the outer lid 120 may generate variation in the static pressure field of the passage flow, which may influence the topology of the secondary flow at the blade hub of the blades 104.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An annulus filler for mounting to a rotor disc of a gas turbine engine, the annulus filler comprising:

a coupling portion connectable to the rotor disc; and an outer lid coupled to the coupling portion and extending axially, radially, and circumferentially with respect to a central axis, wherein the outer lid is configured to be at least partially and circumferentially disposed between two adjacent blades connected to the rotor disc, the outer lid comprising:

a leading edge extending at least circumferentially with respect to the central axis;

a trailing edge axially spaced apart from the leading edge and extending at least circumferentially with respect to the central axis;

a main portion comprising an outer radial surface extending between the leading edge and the trailing edge opposite to the coupling portion, the outer radial surface configured to engage air drawn through the gas turbine engine; and a protruding portion connected to the main portion and extending radially outwardly from the outer radial surface with respect to the central axis, and the protruding portion starts from a second longitudinal edge of the annulus filler and extends toward a first longitudinal edge of the annulus filler, such that the protruding surface is configured to redirect the air drawn through the gas turbine engine, wherein the first longitudinal edge of the annulus filler and the second longitudinal edge of the annulus filler extend from the leading edge to the trailing edge.

2. The annulus filler of claim 1, wherein the outer lid further comprises:

the first longitudinal edge extending at least axially between the leading edge and the trailing edge; and the second longitudinal edge spaced apart from the first longitudinal edge and extending at least axially between the leading edge and the trailing edge, such that the outer radial surface is disposed between the first longitudinal edge, the second longitudinal edge, the leading edge, and the trailing edge.

3. The annulus filler of claim 2, wherein the protruding portion at least partially forms the second longitudinal edge of the outer lid.

4. The annulus filler of claim 1, wherein the outer lid extends at least circumferentially with respect to the central axis by a maximum circumferential width, wherein the protruding portion extends at least circumferentially with respect to the central axis by a maximum circumferential extent, and wherein the maximum circumferential extent of the protruding portion is less than or equal to 80% of the maximum circumferential width of the outer lid.

5. The annulus filler of claim 1, wherein the outer lid extends at least axially with respect to the central axis by a maximum axial length, wherein the protruding portion extends at least axially with respect to the central axis by a minimum axial extent, and wherein the minimum axial extent of the protruding portion is greater than or equal to 50% of the maximum axial length of the outer lid.

6. The annulus filler of claim 5, wherein the outer radial surface defines a nominal plane extending between the leading edge and the trailing edge, wherein the protruding surface extends radially outwardly from the nominal plane by a maximum radial extent at a peak of the protruding portion, and wherein the maximum radial extent of the protruding surface is less than or equal to 20% of the maximum axial length of the outer lid.

7. A rotor assembly for a gas turbine engine, the rotor assembly comprising:
- a rotor disc;
- a plurality of blades coupled to the rotor disc and angularly spaced apart from each other; and
- a plurality of annulus fillers of claim 1, each of the plurality of annulus fillers bridging a gap between corresponding adjacent blades from the plurality of blades, wherein the coupling portion of each annulus filler is coupled to the rotor disc.

8. The rotor assembly of claim 7, wherein each blade comprises a blade leading edge, a blade trailing edge spaced apart from the blade leading edge, a pressure surface extending between the blade leading edge and the blade trailing edge, and a suction surface extending between the blade leading edge and the blade trailing edge opposite to the pressure surface, wherein each blade defines a blade chord length between the blade leading edge and the blade trailing edge at a radial span disposed at the outer radial surface of the main portion of the outer lid adjacent to the suction surface, and wherein a minimum axial distance between the blade leading edge and the protruding portion is less than or equal to 25% of the blade chord length.

9. The rotor assembly of claim 8, wherein a maximum axial distance between the blade leading edge and the protruding portion is greater than or equal to 75% of the blade chord length.

10. The rotor assembly of claim 8, wherein the protruding portion is circumferentially disposed closer to a suction surface of one adjacent blade than a pressure surface of the other adjacent blade.

11. The rotor assembly of claim 8, wherein the outer lid of each of the plurality of annulus fillers extends at least circumferentially with respect to the central axis by a maximum circumferential width, wherein the protruding portion extends at least circumferentially with respect to the central axis by a maximum circumferential extent, and wherein the maximum circumferential extent of the protruding portion is less than or equal to 80% of the maximum circumferential width of the outer lid, and wherein the maximum circumferential extent of the protruding portion is less than or equal to 80% of a maximum circumferential distance between a suction surface of one adjacent blade and a pressure surface of the other adjacent blade.

12. The rotor assembly of claim 8, wherein the outer lid of each of the plurality of annulus fillers extends at least axially with respect to the central axis by a maximum axial length, wherein the protruding portion extends at least axially with respect to the central axis by a minimum axial extent, and wherein the minimum axial extent of the protruding portion is greater than or equal to 50% of the maximum axial length of the outer lid, and wherein the minimum axial extent of the protruding portion is greater than or equal to 50% of the blade chord length.

13. The rotor assembly of claim 8, wherein the outer lid of each of the plurality of annulus fillers extends at least axially with respect to the central axis by a maximum axial length, wherein the protruding portion extends at least axially with respect to the central axis by a minimum axial extent, and wherein the minimum axial extent of the protruding portion is greater than or equal to 50% of the maximum axial length of the outer lid, wherein the outer radial surface defines a nominal plane extending between the leading edge and the trailing edge, wherein the protruding surface extends radially outwardly from the nominal plane by a maximum radial extent at a peak of the protruding portion, and wherein the maximum radial extent of the protruding surface is less than or equal to 20% of the maximum axial length of the outer lid, and wherein the maximum radial extent of the protruding surface is less than or equal to 20% of the blade chord length.

14. A gas turbine engine including at least one annulus filler of claim 1.

* * * * *